(12) United States Patent
Nielsen

(10) Patent No.: US 7,241,463 B2
(45) Date of Patent: Jul. 10, 2007

(54) METHODS FOR PROCESSING CRUSTACEAN MATERIAL

(75) Inventor: Per Munk Nielsen, Hillerod (DK)

(73) Assignee: Novozymes A/S, Bagsvaerd (DK)

( * ) Notice: Subject to any disclaimer, the term of this patent is extended or adjusted under 35 U.S.C. 154(b) by 651 days.

(21) Appl. No.: 10/380,745

(22) PCT Filed: Sep. 21, 2001

(86) PCT No.: PCT/DK01/00607

§ 371 (c)(1),
(2), (4) Date: Mar. 11, 2003

(87) PCT Pub. No.: WO02/00908

PCT Pub. Date: Jan. 3, 2002

(65) Prior Publication Data

US 2003/0185939 A1 Oct. 2, 2003

Related U.S. Application Data

(60) Provisional application No. 60/237,174, filed on Oct. 2, 2000.

(30) Foreign Application Priority Data

Sep. 25, 2000 (DK) ............................... 2000 01413

(51) Int. Cl.
*A23L 1/28* (2006.01)
(52) U.S. Cl. ..................................................... 426/61
(58) Field of Classification Search .................. 426/61, 426/55, 262, 574, 643, 652, 655, 802
See application file for complete search history.

(56) References Cited

U.S. PATENT DOCUMENTS 4,963,491 A * 10/1990 Hellgren et al. ............ 435/264
5,871,574 A    2/1999  Kawaragi et al.
6,461,649 B1 * 10/2002 Ogisu et al. ................... 426/28

FOREIGN PATENT DOCUMENTS

| JP | 60-35057 | 2/1985 |
| JP | 61-015693 | 1/1986 |
| JP | 62-190090 | 8/1987 |
| JP | 62-00179 | 7/1994 |
| JP | 09-301950 | 11/1997 |
| KR | 2001062866 | * 7/2001 |
| WO | WO 90/05765 | 5/1990 |

OTHER PUBLICATIONS

Haard, American Chemical Society, vol. 231, pp. 7-IEC (1997).
Simpson et al., Journal of Applied Biochemistry, vol. 7, pp. 212-222 (1985).
Chen et al., Journal of Food Science, vol. 47, pp. 892-900 (1982).

* cited by examiner

*Primary Examiner*—Keith Hendricks
*Assistant Examiner*—Jyoti Chawla
(74) *Attorney, Agent, or Firm*—Elias J. Lambiris

(57) ABSTRACT

The inventor has found that enzymatic treatment of crustaceans with lipolytic enzymes promotes the extraction of coloured pigment. Accordingly, the invention relates to a method for recovering coloured pigment, e.g. astaxanthin, and/or chitin or chitosan and/or lysolecithins from crustaceans. Lipolytic enzyme(s) may e.g. be lipase or phospholipase. The lipolytic enzyme treated crustacean material may be subjected to additional process steps, including treatment with non-lipolytic enzymes such as e.g. protease. The process of the invention provides several suitable products and several uses of such products. Furthermore, the invention also relates to the cosmetic and consumable products (feed and food (including beverages) products and additives produced therefrom.

30 Claims, No Drawings

METHODS FOR PROCESSING CRUSTACEAN MATERIAL

CROSS-REFERENCE TO RELATED APPLICATIONS

This application is a 35 U.S.C. 371 national stage of International application No. PCT/DK01/00607 filed Sep. 21, 2001, which claims priority or the benefit under 35 U.S.C. 119 of U.S. provisional application No. 60/237,174 filed Oct. 2, 2000 and Danish application No. PA 2000 01413 filed Sep. 25, 2000, the contents of which are fully incorporated herein by reference.

FIELD OF THE INVENTION

The present invention relates to methods for enzymatically processing crustaceans in order to provide useful products therefrom.

BACKGROUND OF THE INVENTION

The usage of carotenoid pigments such as astaxanthin is increasing in the field of food and feed additives as a colorant and/or as an anti-oxidant, in particular for aquacultered fish. Aquatic animals, like terrestrial animals, generally cannot synthesize astaxanthin or other carotenoids but several of these animals, including crustaceans, accumulate astaxanthin present in their diet. Crustaceans have the capability of converting carotenes to astaxanthin. Salmonid fish and red sea bream fish accumulate dietary astaxanthin but these fish cannot convert other carotenes to astaxanthin. Thus, the astaxanthin present in salmonid fish must be derived directly from dietary source.

Currently synthetic astaxanthin is employed as feed additive for coloration of farmed fish for providing its desired characteristic reddish colour. However, consumer concerns have resulted in an increased demand for providing natural astaxanthin to substitute the synthetically produced astaxanthin. This should also be seen in the light of the current general preference for natural products.

The expansion of the crustacean-processing industry has been accompanied by the production of large amounts of crustacean waste containing astaxanthin. Shrimp processing involves the removal of the head and hard carapace, which account for up to about 70% of the whole shrimps. Although pigmentation of fish flesh can be achieved by feeding the fish with crustacean waste, there are several disadvantages to this approach. These include the variable pigment level, the tendency of the raw crustacean waste to deteriorate rapidly, bulkiness and high transportation cost and a high chitin content. Thus, the content of carotenoid pigments in crustacean waste is too low compared to the undesirably high content of chitin and calcium for its use in large amounts in fish feed.

Various chemical methods for extracting pigments, e.g. from crustacean waste and their incorporation into fish feed have been described. Chen et al, Journal of Food Science, vol 47/3, 892–900, 1982 describes extraction of astaxanthin from crustaceans with soy oil alone or in combination with use of proteases. Use of organic solvents for extracting astaxanthin has also been described.

Several references disclose methods involving protease treatment for extraction of astaxanthin from crustaceans, cf. e.g.: Simpson and Haard, Journal of Applied Biochemistry, 7, 212–222, 1985; Chen and Meyers, Journal of Food Science, vol 47, 892–900, 1982. CA1,313,935 also discloses treatment of crustacean waste with protease. In Abstract of Papers, American Chemical Society, vol. 231 p7-IEC, 1997 is disclosed the extraction of carotenoproteins from crustacean wastes by means of trypsin.

JP 60-35057A describes extraction of orange dye from krill with a solvent and subsequently after the extraction adding lipase or an alkali to the extract solution to decompose fatty acid and using a fluid at supercritical state to separate the dye from the extract solution.

JP 62-00179A discloses the extraction and separation of colouring matter from krill, wherein protein is extraction with carbon dioxide in supercritical state from the krill using a protease.

JP 62-190090A discloses the extraction of pigment from vegetable material, such as carrot, pumpkin, by the use of enzymes, such as amylase, protease and cellulase.

In summary, there is a demand for substituting the synthetically produced astaxanthin presently on the market and one object of the present invention is to provide a method for providing natural coloured pigment, such as astaxanthin.

SUMMARY OF THE INVENTION

The inventor has found that enzymatic treatment of crustacean material with lipolytic enzymes possessing phospholipase activity promotes the extraction of coloured pigment from the crustacean material. Said treatment is also beneficial for the extraction of other useful components of the crustacean material. Accordingly, the invention in one aspect provides a method for recovering coloured pigment, e.g. astaxanthin, and/or chitin or chitosan and/or lysolecithins from crustacean material.

The invention relates to a method for processing crustaceans comprising the step of treating a crustacean material with lipolytic enzyme(s), such as e.g. lipase or phospholipase. The lipolytic enzyme treated crustacean material may be subjected to additional process steps. The process of the invention provides several suitable products and several uses of such products. Thus, the invention also relates to the products obtainable by the processes as described herein and to the use of such products, e.g. for feeding animals.

DETAILED DESCRIPTION OF THE INVENTION

The inventor has developed an efficient method for producing natural pigments. In one aspect the invention provides a method for recovering coloured pigment, e.g. astaxanthin, from crustacean material. Accordingly, the invention relates to a process for processing crustaceans comprising the step (i) of treating a crustacean material with a lipolytic enzyme.

The Crustacean Material

In the methods of the present invention, the crustacean material may be any material comprising entire crustaceans or parts thereof. The crustaceans may be of any origin; and the crustaceans may thus be obtained from marine sources and/or freshwater sources. Such crustaceans include, but are not limited to organisms such as krill, shrimp (including prawn), crab, lobster (including Norway Lobster) and sea anemone. Accordingly, the crustacean material processed in the method of the invention may e.g. be obtained from an organism selected from this group. Included is also a crustacean material obtained from a mixture of different species of crustaceans, such as a mixture of two or more of any of these organisms as mentioned herein. Insofar as the purpose for performing the enzymatic treatment of step (i), the crustacean material may be of any crustacean organism or parts thereof comprising reddish/orange pigments. The crustacean material is preferably a solid crustacean material containing the desired pigments. Thus, it is to be understood that the crustacean material to be treated in step (i) in the process of the invention comprises pigments, in particular carotenoids. Thus, said compounds have not been extracted from said crustacean material prior to step (i). However, it is also contemplated that in step (i) the lipolytic enzymatic treatment of the crustacean material also have other advantages apart from promoting the extraction of pigments from said crustacean material. Thus for some embodiments of the invention, the presence of reddish/orange pigments in the crustacean material is not an indispensable criteria, depending on the purpose of such enzymatic treatment. It is contemplated that shrimp and krill are particularly interesting crustacean organisms in the context of the present invention.

As already indicated, the crustacean material may be composed of entire crustaceans (e.g. entire shrimps) or parts thereof (e.g. the shell). The crustacean material may also comprise or consist of crustacean waste (e.g. shrimp) shells, roe and heads originating from e.g. the shrimp processing industry. Thus, in some embodiments, the crustacean material may consist essentially of shrimp shells. Accordingly, the crustacean material may comprise or consist of "entire" crustacean organism (i.e. e.g. both the crustacean shell and the crustacean "meat") or "part" thereof (i.e. e.g. only shells). The "entire" crustacean organism or the "parts" of the crustacean organism forming part of, or constituting the crustacean material, may have been divided into finer parts before or during the enzymatic treatment, such as, but not limited to, crushed shell parts, or it may be intact, such as, but not limited to, whole krill or whole shrimps.

It is understood that crustacean material to be treated with lipolytic enzyme in step (i) is not the crustacean extract as defined herein.

Enzyme Treatment

In addition to the treatment of crustacean material with lipolytic enzyme, the process according to the invention may comprise treating the crustacean material with one or more non-lipolytic enzymes. This treatment of the crustacean material with one or more non-lipolytic enzymes may be performed before, during or after the lipolytic activity treatment. In a preferred embodiment the crustacean material is treated with a protease. It is also contemplated that in other embodiments the crustacean material is not treated with protease. The protease treatment may e.g., be performed simultaneously with the phospholipase treatment. In other embodiments the crustacean material is first treated with protease in an aqueous solution and subsequently the solid phase resulting from separation from the liquid phase is treated with the one or more lipolytic enzyme.

The enzymes used in the process of the invention may be monocomponent enzyme preparations (e.g. only one protease present) or it may be mixture enzyme preparation (e.g. a mixture of several proteases and/or mixtures of several different enzymes, such as a mixture of lipolytic enzymes, e.g. lipases and phospholipases).

The process of the invention may further comprise the step of inactivating and/or removing the added enzyme(s) to obtain a product substantially free from said enzyme(s) activity. In a preferred embodiment the process of the invention comprises inactivating and/or removing the lipolytic enzyme(s) to obtain a product substantially free from said lipolytic activity.

In a broad aspect, the invention relates to a process for extracting coloured pigment from a crustacean material comprising the step of treating the crustacean material with a lipolytic enzyme capable of facilitating such extraction.

In another aspect, the invention relates to a process for extracting carotenoids from a carotenoid containing material (e.g. crustaceans or plants), comprising the step of treating the carotenoid containing material with a lipolytic enzyme capable of facilitating such extraction.

The lipolytic enzyme activity of particular interest for the present invention is lipolytic enzymes capable of facilitating extraction of carotenoids from crustacean material as described herein or from any other material from which it is desired to liberate carotenoids and where lipolytic enzymes facilitates such liberation.

The carotenoid may be any carotenoid present in the material to be treated with lipolytic enzyme as described herein. The carotenoid may, as an example be astaxanthin or an astaxanthin derivative, such as an astaxanthin ester, beta-carotene, cantaxanthin and zeaxanthin, lutein, tunaxanthin, fucoxanthin and halocynthiaxanthin or any combinations of the foregoing. In a preferred embodiment of the process of the invention, by the lipolytic treatment in step (i) is extracted astaxanthin from the crustacean material. Another way to describe the effect of the enzymatic treatment is by the colour of the pigments extracted from the crustacean material present, i.e. by the colour of the extract. The process of the invention provides a method for processing crustaceans wherein by the lipolytic enzyme treatment in step (i) is extracted more reddish and/or orange pigments (e.g. astaxanthin) from said crustaceans material compared to a process without said lipolytic enzyme treatment. In some embodiments of the process of the invention is by the enzyme treatment in step (i) extracted at least ½ time more, at least 2 times, or at least 10 times more carotenoids, e.g. astaxanthin, from said crustaceans material, compared to a similar process without said lipolytic enzyme treatment.

The lipolytic enzyme to be used in the process of the invention may be any lipolytic enzyme.

Lipolytic enzymes are enzymes that hydrolyze carboxylic ester bonds. Depending on the substrate specificity, i.e. the activity on selected ester bonds in selected substrates, the activity may be classified, e.g., as lipase, lysophospholipase, phospholipase A1, phospholipase A2 or digalactosyl diglyceride (DGDG) hydrolase.

Substrate specificity: Thus, lipolytic enzymes are enzymes that hydrolyze carboxylic ester bonds. Such enzymes may have one or more of the following activities, each defined by the action on a certain ester bond in a substrate. The numbers in parentheses are the systematic numbers assigned by the Enzyme Commission of the International Union of Biochemistry in accordance with the type of the enzymatic reactivity of the enzyme.

lipase (triacylglycerol lipase, EC 3.1.1.3), acting on fatty acyl groups in triglycerides, particularly long-chain ($C_{16}$–$C_{20}$) triglycerides, phospholipase A1 (EC 3.1.1.32), acting on fatty acyl groups in the 1-position of intact phospholipids such as lecithin, phospholipase A2 (EC 3.1.1.4), acting on fatty acyl groups in the 2-position of intact phospholipids such as lecithin, lysophospholipase (EC 3.1.1.5), acting on fatty acyl groups in lyso-phospholipids such as lyso-lecithin, Each of the activities may be quantified either in international units (IU) or by assay methods given in WO 00/32758 or in this specification.

Accordingly, the invention provides a method for processing crustacean material, comprising adding to the crustacean material a lipolytic enzyme, such as e.g. a phospholipase. An embodiment relates to a method for processing crustacean material comprising adding to the crustacean material at least two lipolytic enzymes, such as two lipolytic enzymes, having different substrate specificities, such as e.g. phospholipase and lipase activity.

Lipase activity (LU): A substrate for lipase is prepared by emulsifying tributyrin (glycerin tributyrate) using gum Arabic as emulsifier. The hydrolysis of tributyrin at 30° C. at pH 7 is followed in a pH-stat titration experiment. One unit of lipase activity (1 LU) equals the amount of enzyme capable of releasing 1 µmol butyric acid/min at the standard conditions.

Phospholipase activity (PHLU): Phospholipase activity (PHLU) is measured as the release of free fatty acids from lecithin. 50 µl 4% L-alpha-phosphatidylcholine (plant lecithin from Avanti), 4% Triton X-100, 5 mM $CaCl_2$ in 50 mM HEPES, pH 7 is added 50 µl enzyme solution diluted to an appropriate concentration in 50 mM HEPES, pH 7. The samples are incubated for 10 min at 30° C. and the reaction stopped at 95° C. for 5 min prior to centrifugation (5 min at 7000 rpm). Free fatty acids are determined using the NEFA C kit from Wako Chemicals GmbH; 25 µl reaction mixture is added 250 µl Reagent A and incubated 10 min at 37° C. Then 500 µl Reagent B is added and the sample is incubated again, 10 min at 37° C. The absorption at 550 nm is measured using an HP 8452A diode array spectrophotometer. Samples are run in at least in duplicates. Substrate and enzyme blinds (preheated enzyme samples (10 min at 95° C.)+substrate) are included. Oleic acid is used as a fatty acid standard. 1 PHLU equals the amount of enzyme capable of releasing 1 µmol of free fatty acid/min at these conditions.

In a preferred embodiment, the lipolytic enzyme is a lipolytic enzyme having phospholipase activity, such as a lipase and/or a phospholipase, or a combination thereof. In a preferred embodiment the lipolytic enzyme is a phospholipase. In another preferred embodiment the enzyme is a lipase.

Phospholipids, such as lecithin, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes, which participate in the hydrolysis of phospholipids. Several types of phospholipase activity can be distinguished, including phospholipases A1 and A2 which hydrolyze one fatty acyl group (in the sn-1 and sn-2 position, respectively) to form lysophospholipid; and lysophospholipase (or phospholipase B) which can hydrolyze the remaining fatty acyl group in lysophospholipid. Thus, in a preferred embodiment, the invention relates to use of enzymes that have the ability to hydrolyze one and/or both fatty acyl groups in a phospholipid.

The phospholipase activity may be provided by enzymes having other activities as well, such as e.g. a lipase with phospholipase activity. The phospholipase activity may e.g. be from a lipase with phospholipase side activity. In other embodiments of the invention the phospholipase enzyme activity is provided by an enzyme having essentially only phospholipase activity and wherein the phospholipase enzyme activity is not a side activity. In one embodiment of the invention, the phospholipase is not a lipase having phospholipase side activity as defined in WO 98/26057.

The phospholipase may be an enzyme having one or more of the following activities: phospholipase A1 (EC 3.1.1.32), phospholipase A2 (EC 3.1.1.4), phospholipase B, lysophospholipase (EC 3.1.1.5).

In a more preferred embodiment the lipolytic enzyme is a phospholipase A1 or a phospholipase A2. In one embodiment the crustacean material in step (i) is incubated with one or more phospholipase(s) selected from the group consisting of phospholipase A1 and A2.

In one embodiment, the phospholipase has no or only low triglyceride lipase activity (EC 3.1.1.3) at the conditions of the phospholipase treatment. Suitably, the lipase to phospholipase ratio may be below 0.001 LU/LEU or below 0.005 (particularly below 0.001) PHLU/kLU (units defined above).

The crustacean material is incubated with an effective amount of the enzymes as disclosed herein for treating the crustacean material. The term "effective amount" is defined herein as an amount of the enzymes that is sufficient for providing a measurable effect on at least one property of interest for processing crustaceans, in particular for extracting pigments, such as astaxanthin from the crustacean material.

The phospholipase is typically used at a dosage of 0.001–0.05% of enzyme protein to weight of dry solids. A commercial phospholipase product having an activity of 10,000 LEU/g is typically used at a dosage of 20–500 ppm by weight of dry solids.

The enzymes used in the present invention preferably possess a suitable enzyme activity in a pH and temperature range appropriate for processing crustaceans. In one embodiment the enzyme(s) are active over broad pH and temperature ranges.

In a preferred embodiment, the enzyme(s) used in the process of the invention, including the lipolytic enzyme(s) as described herein, has a pH optimum in the range of about 3 to about 10. In a more preferred embodiment, the enzyme(s), including the lipolytic enzyme(s) as described herein, has a pH optimum in the range of about 4.5 to about 8.5.

In another embodiment, the enzyme(s), including the lipolytic enzyme(s) as described herein, has a temperature optimum in the range of about 5° C. to about 100° C. In a more preferred embodiment, the enzyme(s), including the lipolytic enzyme(s) as described herein, have a temperature optimum in the range of about 25° C. to about 75° C.

The enzyme(s), in particular the lipolytic enzyme(s), used in the process of the invention may be obtained from any source such as a plant, microorganism, or animal. The enzymes, including the lipolytic enzyme, may be eukaryotic, e.g. from fungal or animal sources. Examples of lipolytic enzymes from animal sources are phospholipases from bee or snake venom or from mammal pancreas, e.g. porcine pancreas. In a preferred embodiment, the enzymes are preferably obtained from a microbial source, such as a bacterium or a fungus, e.g., a filamentous fungus or yeast. In a preferred embodiment the lipolytic enzyme is prokaryotic, particularly a bacterial enzyme, e.g. from *Pseudomonas* or *Bacillus*.

In a preferred embodiment, the enzymes are obtained from a bacterial source. For example, the enzymes may be obtained from an *Acetobacter, Acinetobacter, Agrobacterium, Alcaligenes, Arthrobacter, Azotobacter, Bacillus, Comamonas, Clostridium, Gluconobacter, Halobacterium,*

*Mycobacterium, Rhizobium, Salmonella, Serratia, Streptomyces, E. coli, Pseudomonas, Wolinella*, or methylotrophic bacterium strain.

In a more preferred embodiment, the enzymes are obtained from an *Acetobacter aceti, Alcaligenes faecalis, Arthrobacter oxidans, Azotobacter vinelandii, Bacillus alkalophilus, Bacillus amyloliquefaciens, Bacillus anitratum, Bacillus brevis, Bacillus circulans, Bacillus coagulans, Bacillus lautus, Bacillus lentus, Bacillus licheniformis, Bacillus megaterium, Bacillus stearothermophilus, Bacillus subtilis, Bacillus thuringiensis, Comamonas testosteroni, Clostridum tyrobutyricum, Gluconobacter dioxyaceticus, Gluconobacter liquefaciens, Gluconobacter suboxydans, Halobacterium cutirubrum, Mycobacterium convolutum, Rhizobium melioti, Salmonella typhimurium, Serratia marcescens, Streptomyces lividans, Streptomyces murinus, Pseudomonas aeruginosa, Pseudomonas fluorescens, Pseudomonas putida*, or *Wolinella succinogens* strain.

In another preferred embodiment, the enzymes are obtained from a fungal source. For example, the enzymes may be obtained from a yeast strain such as a *Candida, Kluyveromyces, Pichia, Saccharomyces, Schizosaccharomyces*, or *Yarrowia* strain; or from a filamentous fungal strain such as an *Acremonium, Aspergillus, Aureobasidium, Chrysosporium, Cryptococcus, Filibasidium, Fusarium, Humicola, Magnaporthe, Monilia, Mucor, Myceliophthora, Neocallimastix, Neurospora, Paecilomyces, Penicillium, Phanerochaete, Piromyces, Schizophyllum, Sclerotium, Sporotrichum, Talaromyces, Thermoascus, Thielavia, Tolypocladium*, or *Trichoderma* strain.

In another more preferred embodiment, the enzymes are obtained from a *Saccharomyces carlsbergensis, Saccharomyces cerevisiae, Saccharomyces diastaticus, Saccharomyces douglasii, Saccharomyces kluyveri, Saccharomyces norbensis*, or *Saccharomyces oviformis* strain.

In another more preferred embodiment, the enzymes are obtained from an *Aspergillus aculeatus, Aspergillus awamori, Aspergillus foetidus, Aspergillus japonicus, Aspergillus nidulans, Aspergillus niger, Aspergillus oryzae, Chrysosporium lignorum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sulphureum, Fusarium toruloseum, Fusarium trichothecioides, Fusarium venenatum, Humicola insolens, Humicola lanuginosa, Monilia sitophila, Mucor miehei, Myceliophthora thermophila, Neurospora crassa, Penicillium purpurogenum, Phanerochaete chrysporum, Polyporus pinsitus, Polyporus versicolour, Sclerotium rolfsii, Sporotrichum thermophile, Trichoderma citrinoviride, Trichoderma hamatum, Trichoderma harzianum, Trichoderma koningii, Trichoderma longibrachiatum, Trichoderma polysporum, Trichoderma reesei, Trichoderma saturnisporum*, or *Trichoderma viride* strain.

In preferred embodiments, the fungal lipolytic enzyme is obtained from the following genus or species: *Humicola* (synonym *Thermomyces*), *H. lanuginosa* (synonym *T. lanuginosus*), *H. insolens, Fusarium, F. oxysporum, F. solani, F. heterosporum, Aspergillus, A. tubigensis, A. niger, A. oryzae, Rhizomucor, Candida, C. antarctica, Penicillium, P. camembertii, Rhizopus, Rhizopus oryzae* or *Absidia*.

Some particular examples of lipolytic enzymes follow:
A phospholipase $A_2$ from porcine pancreas, sold by Novozymes A/S under the tradename LECITASE™.

A lipase from *H. lanuginosa* is described in EP 305 216, and has the amino acid sequence shown in positions 1–269 of SEQ ID NO: 2 of U.S. Pat. No. 5,869,438 (hereinafter referred to as HII or *H. lanuginosa* lipase).

An enzyme from *Fusarium oxysporum* described in WO 98/26057 has lipase and phospholipase A1 activities (hereinafter referred to as FoL or *F. oxysporum* lipase/phospholipase). It has a molecular weight of 30±2 kDa, an isoelectric point of 5.8–6.8 and optimum phospholipase activity above pH 9.

The enzyme described in WO 01/27251.

Alternatively, the lipolytic enzyme may be a variant obtained by altering the amino acid sequence of a naturally occurring enzyme such as the above. Examples of lipolytic variants are described in WO 00/32758.

In one embodiment the phospholipase $A_1$ is from a strain of *Fusarium*, particularly *F. oxysporum*, e.g. from strain DSM 2627 as described in WO 98/26057, especially described in claim 36 and SEQ ID NO. 2 therein.

The enzymes, including the lipolytic enzyme (such as e.g. the phospholipase), used in the process of the invention may be an enzyme which has an amino acid sequence identical to that of a native enzyme or it may have a modified amino acid sequence, e.g. having one or more amino acids which are deleted, inserted and/or substituted, i.e. a recombinantly produced or synthetically produced enzyme which is a mutant and/or a fragment of a native amino acid sequence. Within the meaning of a native enzyme are included natural variants.

The enzymes used in the process of the invention may be obtained by use of any suitable technique. For instance, a phospholipase enzyme preparation may be obtained by fermentation of a suitable microorganism and subsequent isolation of a phospholipase preparation from the resulting fermented broth or microorganism by methods known in the art. Accordingly, the enzymes may be obtained from the organism in question by any suitable technique, and in particular by use of recombinant DNA techniques known in the art (c.f. Sambrook, J. et al., 1989, *Molecular Cloning, A Laboratory Manual*, Cold Spring Harbor Press, Cold Spring Harbor, N.Y., USA). The use of recombinant DNA techniques generally comprises cultivation of a host cell transformed with a recombinant DNA vector, consisting of the product gene of interest inserted between an appropriate promoter and terminator, in a culture medium under conditions permitting the expression of the enzyme and recovering the enzyme from the culture. The DNA sequence may be of genomic, cDNA or synthetic origin or any mixture of these, and may be isolated or synthesized in accordance with methods known in the art. As described, the enzyme may also be obtained from its naturally occurring source, such as a plant or organism, or relevant part thereof. The enzymes may also be obtained from commercial suppliers, e.g. from Novozymes A/S, Denmark.

Thus, the enzymes to be used in the methods of the present invention may be in any form suitable for the use in question, e.g., in the form of a dry powder, agglomerated powder, or granulate, in particular a non-dusting granulate, a liquid, in particular a stabilized liquid, or a protected enzyme. The enzyme preparation is preferably in the form of a liquid.

The term "protease" as used in the present invention is defined herein as an enzyme which catalyses the hydrolysis of peptide linkages. It will be understood that the term "proteases" encompasses endoproteases and exopeptidases (aminopeptidases and carboxypeptidases).

Process Steps, Products Obtained and Uses Thereof

The invention provides a method for processing crustaceans comprising the step (i) of treating a crustacean material with a, i.e. one or more, lipolytic enzymes.

For the process of the invention, the treatment in step (i) of the crustacean material with lipolytic enzyme is preferably performed in an aqueous liquid. Thus, the crustacean material may be suspended in an aqueous liquid prior to and/or during step (i).

The suspended crustacean material may be heat treated prior to enzyme treatment or the heat treatment may be omitted.

The enzymatic treatment in step (i) may be performed at any temperature, pH and incubation time found suitable for the enzyme in question. In one embodiment of the process of the invention, the pH is adjusted before the treatment with enzyme. In other embodiments the pH is not adjusted before the treatment with the enzyme(s).

In a preferred embodiment, the pH value is in the range of about 3 to about 12. In other embodiments, the pH is in the range of about 4.5 to about 8.5.

The enzyme treatment is preferably performed at a temperature optimum for the enzyme in question. In some embodiments, the enzyme treatment is performed at a temperature in the range of about 5° C. to about 100° C. In other embodiments, the temperature is in the range of about 10° C. to about 90° C. In a more preferred embodiment, the temperature is in the range of about 20° C. to about 75° C.

The enzyme treatment is performed at any time found suitable, depending on the enzyme activity present. The enzyme treatment may e.g. be performed for about 10 minutes to about 10 hours, such as e.g. from about 30 minutes to about 6 hours.

In one embodiment, pancreas-derived phospholipase $A_2$ is used at 30–70° C., pH 3–12 (particularly preferred is 4.5–8.5). In other embodiments, phospholipase A1 from *Fusarium oxysporum* is used at 20–50° C., pH 3–12 (particularly preferred 4.5–8.5).

In some embodiments, the crustacean material is also contacted with one or more of the following compounds: a anti-oxidative agent (e.g. a chemical anti-oxidant such as e.g. BHA=Butylated Hydroxyanisole and HT=Butylated Hydroxytoluene) a physical anti-oxidant such as e.g. nitrogen blanketing), an oxygen scavenger, e.g. an enzymatic scavenger such as a laccase, citric acid, EDTA, a tenside, gelating compounds, acid/base to regulate the pH, and in general compounds facilitating the activity of the enzymes used in the process of the invention.

It may be preferred to perform the extraction of astaxanthin under low oxygen content. In one embodiment this is provided with laccase treatment as described in WO 96/31133. The term "laccase" as used in the present invention is defined herein as a benzenediol:oxygen oxidoreductase, which catalyzes the oxidation of four benzenediols in the presence of molecular oxygen to four benzosemiquinones and two waters.

Within the scope of the invention, are processes wherein the lipolytic enzyme treated crustacean material is further processed into a consumable product, including e.g. feed or food product (food products comprising beverages), included are also feed or food additives. Within the scope of the invention are also processes wherein the lipolytic enzyme treated crustacean material is further processed into a cosmetic product or a health food product or functional food product or a pharmaceutical drug.

The process of the invention may further comprise after and/or during step (i), the step (ii) of separating the liquid phase (also termed "crustacean extract" or just "extract") from the solid crustacean material. The separation may be performed by any suitable techniques, for example by centrifugation, sieving or decanting.

In further embodiments, the liquid phase is not separated from the solid crustacean material neither after nor during step (i).

Within the scope of the invention, are processes wherein the solid crustacean material of step (ii) is further processed into a consumable product, including e.g. feed or food product (food products comprising beverages), included are also feed or food additives. Within the scope of the invention are also processes wherein the crustacean solid of step (ii) is further processed into a cosmetic product or a health food product or functional food product or a pharmaceutical drug.

In one embodiment the solid crustacean material is further processed in order to recover chitin or chitosan therefrom.

Within the scope of the invention, are also processes wherein the crustacean extract of step (ii) is further processed into a consumable product, including e.g. a feed or food product (food products comprising beverages), included are feed or food additives. Within the scope of the invention is also processes wherein the crustacean extract of step (ii) is further processed into a cosmetic product, a health food product or functional food product or a pharmaceutical drug.

The extract may be concentrated. The concentration may be performed by any suitable techniques, such as e.g. evaporation, membrane filtration, and drying. In one embodiment, the process comprises a step wherein the extract is made substantially dry, i.e. having a low water content, such as e.g. about 5%, e.g. in the range about 3% to about 10%.

In a preferred embodiment the process further comprises the step of purifying the extracted carotenoid compounds from the liquid phase to obtain a preparation enriched in carotenoid compounds. The recovered carotenoid preparation may e.g. be in a form containing at least 100 ppm carotenoid. In another embodiment the carotenoid compounds are separated from the hydrolysed fatty compounds, such as the lysolecithin. In other embodiments of the invention, the carotenoid compounds are not separated from the hydrolysed fatty compounds, such as the lysolecithin. Processes for separation can be membrane filtration or other filtration steps, and/or ion exchange.

It is preferred that the crustacean material before step (i) has not been treated with an organic solvent. In a preferred embodiment the crustacean material before step (i) has not been treated with one or more organic solvents selected from the group consisting of acetone, n-hexane and ethyl acetate.

The invention also relates to a method for extracting coloured pigment contained in krill, comprising decomposing the krill with protease to remove proteins, and treating the residue krill with lipolytic enzyme.

In one aspect, by step (i) in the process of the invention is extracted coloured pigment from said crustaceans material.

In one aspect, by step (i) in the process of the invention is extracted reddish and/or orange pigments from said crustaceans material.

In one aspect, by step (i) in the process of the invention are extracted carotenoids from the said crustaceans material.

In one aspect, by step (i) in the process of the invention is extracted one or more carotenoids from the crustaceans material, the carotenoids selected from the group consisting of astaxanthin, astaxanthin derivatives, such as astaxanthin esters, beta-carotene, cantaxanthin and zeaxanthin, lutein, tunaxanthin, fucoxanthin and halocynthiaxanthin.

In one aspect, by step (i) in the process of the invention is extracted astaxanthin from the said crustaceans material.

In one aspect, in step (i) in the process of the invention, wherein the lipolytic enzyme is a phospholipase (such as e.g. phospholipase $A_1$ and/or $1A_2$), are formed lysolecithin by the phospholipase enzymatic treatment. The product may be incorporated into a consumable product, such as a feed or food product, including feed or food additives.

A preferred embodiment refers to a process for providing coloured pigment, comprising the steps of: (i) incubating crustacean material with an aqueous liquid comprising an effective amount of a lipolytic enzyme under conditions suitable to ensure the enzymatic activity of said enzyme; and (ii) separating the liquid phase comprising extracted coloured pigment from the solid crustacean material.

A further preferred embodiment relates to a process for providing astaxanthin, comprising the step of: (i) incubating substantially crushed shrimp shells with an aqueous liquid comprising an effective amount of lipolytic enzyme as disclosed herein under conditions suitable to ensure the enzymatic activity of said enzyme; and (ii) separating the liquid phase comprising extracted astaxanthin from the solid crushed shrimp shells.

The invention also relates to products obtainable or obtained by any of the processes of the invention as disclosed herein, in particular the methods for processing crustacean material as disclosed herein.

A preferred embodiment relates to products obtainable or obtained by a process of the invention wherein the lipolytic enzyme in step (i) is a phospholipase, including e.g. phospholipase $A_1$ and/or phospholipase $A_2$ and wherein said obtainable or obtained product comprises carotenoid(s), such as e.g. astaxanthin, and lysolecithin(s).

The invention also relates to a process for the manufacturing of a consumable product comprising a step, wherein a product obtainable or obtained by any of the processes of the invention (for processing a crustacean material) is incorporated into said consumable product. The consumable product is e.g. a feed or food product, including feed or food additives.

A preferred embodiment relates to a process for the manufacturing of a consumable product comprising a step, wherein:

(a) a product obtainable or obtained by a process of the invention for processing a crustacean material and where the lipolytic enzyme in step (i) of said process is a phospholipase, including e.g. phospholipase $A_1$ and/ or phospholipase $A_2$ and wherein said obtainable or obtained product comprises carotenoid(s), such as e.g. astaxanthin, and lysolecithin(s);

is incorporated into said consumable product. The consumable product is e.g. a feed or food product, including feed or food additives The invention also relates to a process for the manufacturing of a consumable product, which method comprises a step, wherein a crustacean extract obtained or obtainable from step (ii) of the process for processing a crustacean material as described herein, is incorporated into said consumable product; the crustacean extract may have been further processed after step (ii) before the incorporation into the consumable product. The consumable product is e.g. a feed or food product, including feed or food additives. In a preferred embodiment, the crustacean extract to be incorporated into the consumable product is obtained or is obtainable by a method for processing crustaceans as described herein where the lipolytic enzyme in step (i) is a phospholipase, including e.g. phospholipase $A_1$ and/or phospholipase $A_2$, and where said obtainable or obtained product comprises carotenoid(s), e.g. astaxanthin, and lysolecithin(s).

The invention also relates to a composition comprising astaxanthin and lysolecithin.

The invention further relates to a consumable product, e.g. food or feed product or additive, comprising or consisting of the products obtainable or obtained by any of the processes of the invention as disclosed herein, in particular by the processes for processing crustacean material as disclosed herein.

A preferred embodiment relates to a consumable product, e.g. a food or a feed product or additive, comprising or consisting of a product obtainable or obtained by the method of the invention for processing crustacean material, wherein the lipolytic enzyme in step (i) is a phospholipase, including e.g. phospholipase $A_1$ and/or phospholipase $A_2$ and wherein said obtainable or obtained product comprises carotenoid(s), such as e.g. astaxanthin, and lysolecitin(s).

The invention in a further aspect relates to a method for feeding animals, comprising administering the feed product or feed additive of the invention to the animal. The animal may as an example be fish or poultry. The animal may be selected from, but not limited to, the group consisting of salmonid species, sea, bream, shrimps and lobster. The salmonid may e.g. be trout or salmon. The salmon may e.g. be rainbow trout, atlantic salmon, chinook salmon, coho salmon, pink salmon, chum salmon or pacific salmon. The animal may also be crustaceans. The poultry may be selected from, but not limited to egg laying hens.

In a preferred embodiment the invention relates to a method for feeding fish, in particular fish larvae, the method comprising the step of feeding the fish (including e.g. fish larvae) with a feed product or additive comprising astaxanthin, and lysolecitin(s).

The carotenoid pigments obtained by the process of the invention may e.g. be used as a colorant and/or as an anti-oxidant.

The invention in further aspect relates to the use of a phospholipase for providing astaxanthin.

In a preferred embodiment the invention relates to the use of a lipolytic enzyme (e.g. a phospholipase, such as e.g. phospholipase $A_1$ or phospholipase $A_2$) for extracting astaxanthin from a crustacean material.

The astaxanthin may also by used for incorporation into food stuffs such as poultry and egg, diary products, snack food and the like.

The invention in further aspects relates to the use of phospholipase for the manufacturing of crustacean food or feed product or additive. In particular, the invention relates to the use of a phospholipase for the manufacturing of a carotenoid containing product starting from a crustacean carotenoid source. This also includes use of an enzyme preparation comprising phospholipase as disclosed herein, e.g. phospholipase $A_1$ or $A_2$ for the manufacturing of a carotenoid containing product starting from a crustacean carotenoid source.

The methods of the present invention are advantageous over conventional astaxanthin extraction methods in that the methods provide a high yield of coloured pigments, such as astaxanthin, as well as other useful components, such as chitin or chitosan and/or lysolecithins. Furthermore, enzymatic extraction methods are considered more consumer desirable over chemical extraction methods due to the use of organic solvents. Moreover the method of the invention provides a desired alternative to the synthetic produced astaxanthin by being from a natural source.

The present invention is further described by the following examples that should not be construed as limiting the scope of the invention.

EXAMPLES

Example 1

In this experiment the difference in efficiency of coloured pigment extraction from shrimp shells using different enzyme additions was tested.

Method:

Finely grinded shrimp shells (by-product from a shrimp peeling factory) were added water 1:1 and blended. Temperature was adjusted to 55° C.

Enzyme treatment time was 5 hours and at 55° C. followed by a heating for 10 minutes at 85° C. After heating the samples were centrifuged (3000 rpm 10 minutes) to obtain the extract as supernatant.

Colour pigment measuring: Colour measuring with coordinates L a b, Minolta.

The following enzymes were used:
1. A neutral endo-protease preparation from *Bacillus amyloliquefaciens* (NEUTRASE 0.8L™)
2. Trypsin extracted from porcine pancreas (PTN 6.0S™)
3. A lipolytic enzyme preparation with very high phospholipase $A_2$ activity, extracted from porcine pancreas (LECITASE 10L™)
4. Lipase origin from *Rhizomucor miehei*. (PALATASE 20,000L™)

All were obtained from Novozymes A/S, Denmark.

Enzyme dosage according to Table 1.

TABLE 1

| | Experimental plan | | | | | |
|---|---|---|---|---|---|---|
| | 1 | 2 | 3 | 4 | 5 | 6 |
| Protease: NEUTRASE 0.8 L ™ % (w/w) of shrimp | 0.5 | 0.5 | | | | |
| Protease: PTN 6.0 S ™ % (w/w) of shrimp | | | 0.1 | 0.1 | | |
| Phospholipase $A_2$: LECITASE 10 L % (w/w) of shrimp | | 0.1 | | 0.1 | 0.1 | |
| Lipase: PALATASE 20,000 L ™, % (w/w) of shrimp | | | | | | 0.1 |
| Description of colour | light yellow | red/ orange | Light orange | grey orange | red/ orange | Orange |

Results: the preferred colour of the extract is red. The highest intensity in red colour was obtained when LECITASE 10L™ (phospholipase $A_2$) was used alone (Sample 5). Second most intense red colour was sample 2 where both LECITASE 10L™ (phospholipase $A_2$) and protease were used. Thus, the protease (NEUTRASE™) did not increase the intensity of red colour. Extracting with the lipase PALATASE™, resulted in an orange coloured extract much less intense in red colour compared to the LECITASE 10L (phospholipase $A_2$) samples (5 and 2). The two samples extracted with protease alone (Neutrase and trypsin, sample 1 and 3, respectively) developed only a light yellow colour.

Example 2

In this experiment the difference in efficiency of coloured pigment extraction from shrimp shells using different lipolytic enzyme preparations with phospholipase activity was tested. A comparison to extraction with no enzyme added was made for reference.

Method:

Finely grinded shrimp shells (by-product from a shrimp peeling factory) were added water 1:1 and blended. Temperature was adjusted to 55° C.

Enzyme treatment time was 5 hours at 55° C., followed by a heating time of 10 minutes at 85° C. After heating the samples were centrifuged (Centrifugation 3000 rpm 10 minutes) to obtain the extract as supernatant.

Colour pigment measuring as in example 1.

Following enzymes were used:
1. Neutral endo-protease from *Bacillus amyloliquefaciens*. (NEUTRASE 0.8L™)
2. Lipolytic enzyme preparation with very high phospholipase $A_2$ activity, extracted from porcine pancreas (LECITASE 10L™)
3. *Fusarium oxysporum* lipolytic enzyme preparation with very high phospholipase $A_1$ activity (LECITASE NOVO™)

All were obtained from Novozymes A/S, Denmark

Enzyme dosage according to table 2 Trial number 2 was performed at pH 5.0 adjusted with HCl.

TABLE 2

| | Experimental plan | | |
|---|---|---|---|
| | 1 | 2 | reference |
| Protease: NEUTRASE 0.8 L ™ % (w/w) of shrimp | 0.5 | 0.5 | |
| Phospholipase $A_2$: LECITASE 10 L ™ % (w/w) of shrimp | 0.1 | | |
| Phospholipase $A_1$: LECITASE NOVO ™ % (w/w) of shrimp | | 0.2 | |
| Description of colour | red/orange | orange/red | light yellow |

Results:

Both enzyme preparations with different phospholipase activity ($A_1$ and $A_2$) developed significant intensity of the wanted red/orange colour. The highest intensity in red colour was achieved in trial 1 with LECITASE 10L (Phospholipase $A_2$). Trial 2 (Phospholipase $A_1$) was also significantly more intense in colour compared to the reference sample.

The invention claimed is:

1. A process for processing crustaceans, comprising treating a crustacean material with a lipolytic enzyme having phospholipase activity.

2. The process of claim 1, wherein the treatment of the crustacean material is performed in an aqueous liquid.

3. The process of claim 1, further comprising processing the crustacean material treated with the lipolytic enzyme into a feed or food product.

4. The process of claim 1, wherein the crustacean material is a solid crustacean material.

5. The process of claim 4, further comprising, alter and/or during the treatment of the solid crustacean material, separating a liquid phase from the solid crustacean material.

6. The process of claim 5, further comprising, after the separation of the liquid phase, processing the solid crustacean material in order to recover chitin or chitosan.

7. The process of claim 2, further comprising purifying a carotenoid compound from a liquid phase to obtain a preparation enriched in a carotenoid compound.

8. The process of claim 7, wherein the carotenoid compound is selected from the group consisting of astaxanthin, astaxanthin derivatives, beta-carotene, cantaxanthin, zeaxanthin, lutein, tunaxanthin, fucoxanthin and halocynthiaxanthin and any combination of the foregoing.

9. The process of claim 1, wherein the crustacean material prior to the treatment has not been treated with an organic solvent.

10. The process of claim 1, further comprising treating the crustacean material with one or more non-lipolytic enzymes.

11. The process of claim 10, wherein the non-lipolytic enzyme is a protease.

12. The process of claim 1, further comprising inactivating and/or removing the lipolytic enzyme to obtain a preduot substantially free from the activity of the lipolytic enzyme.

13. The process of claim 1, wherein the crustacean material is obtained from an organism selected from the group consisting of krill, shrimp, prawn, crab, lobster, sea anemone, and mixtures thereof.

14. The process of claim 13, wherein the organism is prawn.

15. The process of claim 13, wherein the organism is shrimp and/or krill.

16. The process of claim 13, wherein the crustacean material comprises shrimp shells, heads and roe.

17. The process of claim 1, further comprising purifying reddish and/or orange pigments from a liquid phase to obtain a preparation enriched in reddish and/or orange pigments.

18. The process of claim 1, wherein the lipolytic enzyme has lipase and phospholipase activity.

19. The process of claim 1, wherein the lipolytic enzyme is a lipase or a phospholipase or a combination thereof.

20. The process of claim 19, wherein the lipolytic enzyme is a phospholipase A1, phospholipase A2, or a mixture thereof.

21. The process of claim 1, further comprising incorporating the crustacean material treated with the lipolytic enzyme into a consumable product.

22. A process for providing colored pigment, comprising:
    (a) incubating a solid crustacean material in an aqueous liquid comprising an effective amount of a lipolytic enzyme having phospholipase activity under conditions suitable to ensure the enzymatic activity of the lipolytic enzyme; and
    (b) separating the liquid phase comprising extracted colored pigment from the solid crustacean material.

23. The process of claim 22, wherein the colored pigment comprises reddish and/or orange pigment.

24. The process of claim 22, wherein the colored pigment comprises astaxanthin.

25. The process of claim 22, further comprising treating the solid crustacean material with one or more non-lipolytic enzymes.

26. The process of claim 25, wherein the non-lipolytic enzyme is a protease.

27. A process for providing caratenoid(s), comprising:
    (a) incubating a crustacean material in an aqueous liquid comprising an effective amount of a lipolytic enzyme having phospholipase activity under conditions suitable to ensure the enzymatic activity of the lipolytic enzyme; and
    (b) separating the liquid phase comprising extracted caratenoid(s) from the solid crustacean material.

28. The process of claim 27, further comprising separating lysolecithins from the carotenoid(s).

29. The process of claim 28, further comprising incorporating the lysolecithins into a consumable product.

30. A process for providing astaxanthin, comprising:
    (a) incubating crushed shrimp shells in an aqueous liquid comprising an effective amount of a lipolytic enzyme having phospholipase activity under conditions suitable to ensure the enzymatic activity of the lipolytic enzyme; and
    (b) separating the liquid phase comprising extracted astaxanthin from the solid crushed shrimp shells.

* * * * *